Aug. 11, 1925.
Q. KORNELY
1,549,366
CLUTCH RELEASE LEVER
Filed May 17, 1923
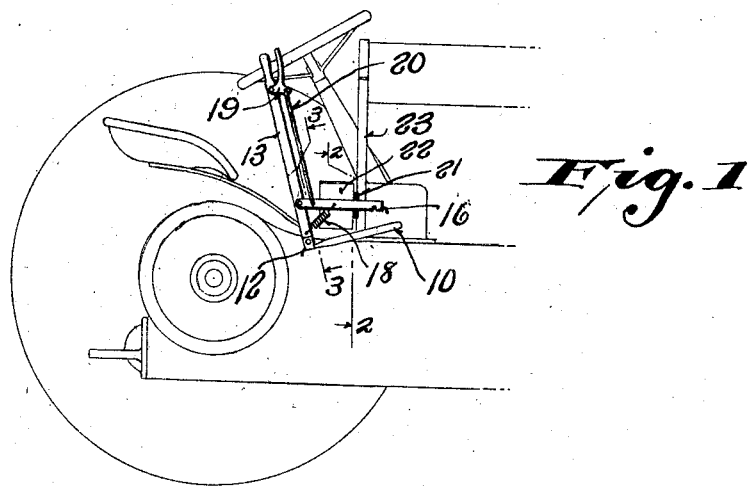
Fig. 1
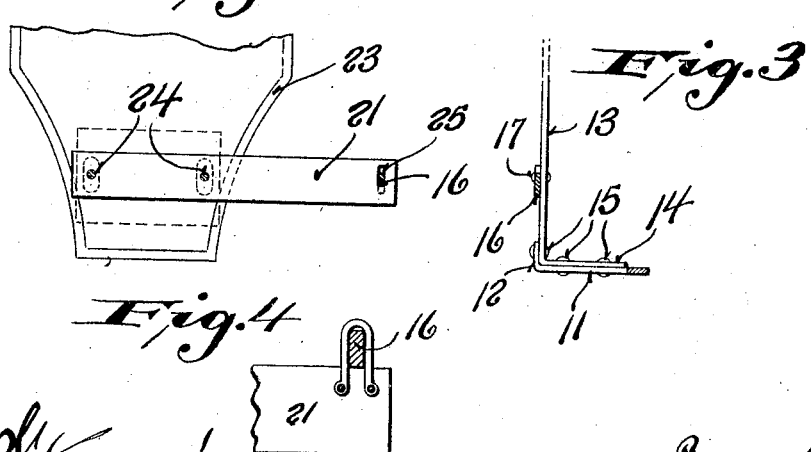
Fig. 2
Fig. 3
Fig. 4
Witness
R. E. Weber
Inventor:
Quirin Kornely
By
Attorneys Patented Aug. 11, 1925.

1,549,366

UNITED STATES PATENT OFFICE.

QUIRIN KORNELY, OF TWO RIVERS, WISCONSIN, ASSIGNOR OF ONE-HALF TO NICHOLAS SILBERSACK, OF TWO RIVERS, WISCONSIN.

CLUTCH-RELEASE LEVER.

Application filed May 17, 1923. Serial No. 639,522.

*To all whom it may concern:*

Be it known that I, QUIRIN KORNELY, a citizen of the United States, and resident of Two Rivers, in the county of Manitowoc and State of Wisconsin, have invented certain new and useful Improvements in Clutch-Release Levers; and I do hereby declare that the following is a full, clear, and exact description thereof.

The invention relates to a lever which is secured to the stirrup of a clutch lever, and means cooperating with the lever for retaining the clutch in or out as desired.

Hitherto difficulty has been encountered in driving tractors of such type as the Fordson by reason of the fatiguing of the foot of the driver by reason of the continued contact with the stirrup.

It is a primary object of the invention to obviate this trouble by the provision of manually operable means for shifting the clutch, means being associated therewith for retaining the clutch in or out, as desired. After the adjustment of the clutch, the hand may be removed from the lever so that both hand and foot of the driver are free.

An object of the invention is the provision of a structure which may be conveniently attached to the clutch lever and which calls for substantially no modification of the structure of the tractor. The hand lever is secured to the stirrup of the clutch lever and a bar for retaining a latch is provided, held in position by the tool box bolts. These bolts are utilized, therefore, to accomplish a two-fold purpose and the structure of the tractor is unchanged.

An object of the invention is the provision of retaining means for holding the clutch in and out, of such character as not readily to become detached, even under adverse operating conditions and despite shock and vibration.

A further object of the invention is the provision of parts of especial simplicity and ease of manufacture, capable of being turned out at a low cost of production.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1 is a side elevation of the device as applied to a tractor, a portion of the tractor being outlined, a rear wheel being removed.

Figures 2 and 3 are sections on the lines 2—2 and 3—3 of Figure 1 respectively.

And Figure 4 is an enlarged detailed view illustrating a modified form of the latch guide.

The clutch lever 10 is substantially L-shaped, having a laterally directed stirrup 11 thereon, terminating in an upwardly directed flange 12. The hand lever 13 has a laterally directed arm 14 thereon, fitting against stirrup 11 with which the lever is made rigid by rivets 15. A latch 16 is pivoted at 17 to the lever, and a spring 18 secured at one end to the lever and at the other to the latch urging the latter downwardly. At the upper end of the hand lever, a hand grip 19 is pivoted, having a link 20 thereon secured at its other end to latch 16. The latch is provided with a pair of notches of rectangular shape, each adapted to cooperate with bar 21 which is secured in position between tool box 22 and the dash 23, a pair of bolts 24 retaining the bar in position, the ordinary bolts provided on the tractor being used for this purpose. The bar 21 projects out from the dash towards the right for a considerable distance, and at its end is provided with a slot 25 receiving latch 16. As hand lever 13 is secured directly to the stirrup and as the tractor is substantially unmodified for the reception of bar 21, the tractor is changed but little for the reception of the novel clutch release lever. On the movement of the clutch in or out, which is accomplished by means of the foot on the stirrup or by operation of the hand lever, the latch 16 is disposed in such relation to bar 21, that the tension of spring 18 operates when there is no manual pressure on hand grip 19 to move the latch downwardly, the bar being received in one of the notches therein. One of the two notches corresponds therefore, to the in-position of the clutch, the other to the out-position. The latch is retained snugly in position despite shock and vibration of the tractor, as it is impossible for the latch to move forwardly or rearwardly, as the notch receiving bar 21 is substantially rectangular and has no inclined edge. After the clutch is in proper adjusted position, it is retained therein, it being unnecessary for the foot of the driver to rest on the stirrup. Thus there is absent the fatiguing action of the stirrup heretofore resulting from the prolonged contact of the foot therewith.

Attention is directed to the fact that the locking bar 24 is provided with spaced bolt apertures, whereby it can be conveniently inserted between the tool box and dash, thus utilizing the tool box clamping bolts for attaching the same to the conductor, whereby machine work is avoided and economy in assemblage is accomplished, it being understood that the tool box bolts, when tightened up, will rigidly clamp the bar between the tool box and dash.

From a practical standpoint this feature is important as this device is sold as a unit and particularly designed to be applied to a standard tractor by those unskilled in the art of mechanics.

Another important and salient feature in connection with the clutch release mechanism is that the hand lever and associated parts extend from the stirrup and upwardly from the outer end of the stirrup, whereby the hand lever 13 forms a strap on the outside of the stirrup, while the clutch lever arm 10 forms an inner strap. Thus this construction will not only eliminate the possibility of the operator's foot slipping from its grip upon the stirrup when the device is functioning, but it also brings the hand lever 13 outside of the leg of the operator to a convenient position for gripping and manipulation, whereby the said hand lever can be swung back and forth clear of the operator's knee.

I claim:

In a tractor having a dash, a tool box, bolts for securing the tool box to the dash, the said tractor having a clutch pedal on one side thereof, terminating with an outwardly extended stirrup, the combination of an auxiliary clutch lever attachment for controlling the clutch pedal, the same including a bar having an end pressure and spaced bolt apertures adapted to engage the tool box bolts, whereby said bar is attached to the tractor between the tool box and dash, a hand lever having an inwardly extending arm fitted to and secured to the clutch lever stirrup, the hand lever proper forming an outer strap in connection with the clutch lever which forms an inner strap whereby the hand lever is free to travel unobstructively back and forth outside of the leg of the operator when the mechanism is manually operated, a spring pawl pivoted to the strap portion of the hand lever, the same being fitted through the end aperture of the locking bar and notched for engagement therewith, and a hand controlled latch for lifting the pawl.

In testimony that I claim the foregoing I have hereunto set my hand at Milwaukee, in the county of Milwaukee and State of Wisconsin.

QUIRIN KORNELY.